United States Patent
Suzuki

(10) Patent No.: US 9,804,908 B2
(45) Date of Patent: Oct. 31, 2017

(54) LOG OUTPUT CONDITION SETTING METHOD AND APPARATUS

(71) Applicant: FUJITSU LIMITED, Kawasaki-shi, Kanagawa (JP)

(72) Inventor: Yuichiro Suzuki, Shizuoka (JP)

(73) Assignee: FUJITSU LIMITED, Kawasaki (JP)

( * ) Notice: Subject to any disclaimer, the term of this patent is extended or adjusted under 35 U.S.C. 154(b) by 153 days.

(21) Appl. No.: 14/477,985

(22) Filed: Sep. 5, 2014

(65) Prior Publication Data

US 2015/0100835 A1 Apr. 9, 2015

(30) Foreign Application Priority Data

Oct. 9, 2013 (JP) ................................ 2013-212334

(51) Int. Cl.
*G06F 11/07* (2006.01)
*G06F 11/34* (2006.01)

(52) U.S. Cl.
CPC ...... *G06F 11/0706* (2013.01); *G06F 11/0778* (2013.01); *G06F 11/34* (2013.01)

(58) Field of Classification Search
CPC ............. G06F 11/3476; G06F 11/3636; G06F 17/30368; G06F 2201/86
See application file for complete search history.

(56) References Cited

U.S. PATENT DOCUMENTS

| | | | | |
|---|---|---|---|---|
| 2006/0225073 | A1* | 10/2006 | Akagawa | G06F 9/52 718/1 |
| 2009/0222492 | A1 | 9/2009 | Yamauchi et al. | |
| 2011/0283263 | A1 | 11/2011 | Gagliardi et al. | |
| 2012/0233600 | A1* | 9/2012 | Uno | G06F 11/3636 717/128 |
| 2014/0279918 | A1* | 9/2014 | Han | G06F 11/366 707/648 |

FOREIGN PATENT DOCUMENTS

| | | |
|---|---|---|
| JP | 2004-94374 | 3/2004 |
| JP | 2008-15733 | 1/2008 |
| JP | 2009-205488 | 9/2009 |
| JP | 2011-238232 | 11/2011 |
| JP | 2012-18512 | 1/2012 |

OTHER PUBLICATIONS

Office Action issued by the Japanese Patent Office dated Feb. 7, 2017 corresponding Japanese patent application No. 2013-212334.

* cited by examiner

*Primary Examiner* — Jigar Patel
(74) *Attorney, Agent, or Firm* — Staas & Halsey LLP

(57) ABSTRACT

A log output condition setting method is disclosed. The method includes, when a call for a log acquisition target is made, acquiring a context of the call, and based on the acquired context and storage information that has stored therein information in which a context of a call for the log acquisition target and a processing result are associated, setting an output condition for a log in the log acquisition target.

8 Claims, 15 Drawing Sheets

INPUT VALUE x1 OR y1 INCLUDED
IN RANGE HAVING PAST PROCESSING RECORD

INPUT VALUE x2 OR y2 OF
RANGE NOT HAVING PAST PROCESSING RECORD

FIG. 3A

WHEN methodB IS CALLED FROM methodA IN INTERNAL STATE α

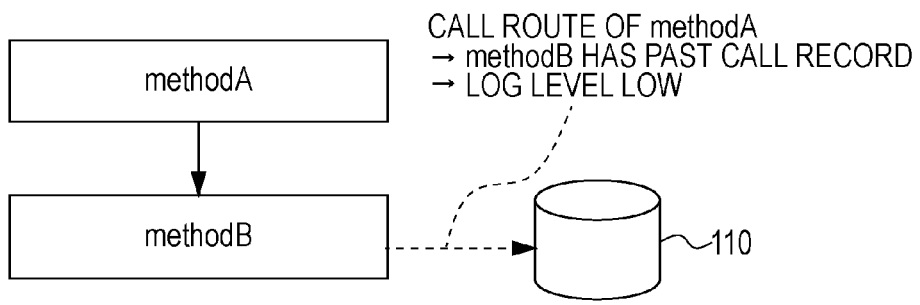

CALL ROUTE OF methodA
→ methodB HAS PAST CALL RECORD
→ LOG LEVEL LOW

FIG. 3B

WHEN, IN SEPARATE INTERNAL STATE β, subMethodC IS CALLED FROM methodA AND STATE γ IS REACHED, AND THEREAFTER methodB IS CALLED

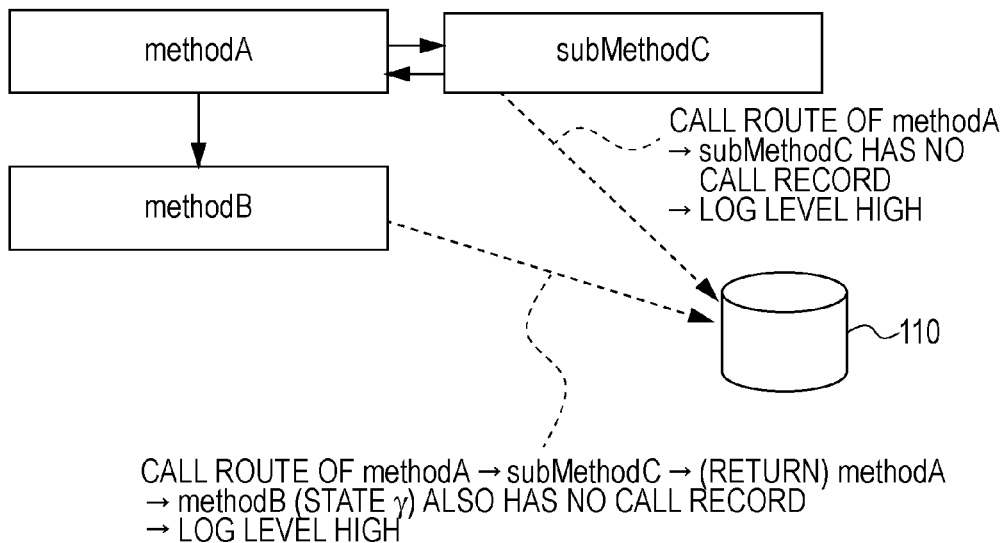

CALL ROUTE OF methodA
→ subMethodC HAS NO CALL RECORD
→ LOG LEVEL HIGH

CALL ROUTE OF methodA → subMethodC → (RETURN) methodA
→ methodB (STATE γ) ALSO HAS NO CALL RECORD
→ LOG LEVEL HIGH

FIG. 7A

| METHOD (ARGUMENT: INTEGER) | NORMAL VALUE RANGE | ABNORMAL VALUE RANGE (CHAINED IN LIST FORMAT) | | | | |
|---|---|---|---|---|---|---|
| A | 0 | NO INFORMATION | | | | |
| B | −5 TO 1024 | 0 | 256 | | | |
| C | 1 TO 65535 | 0 | | | | |

FIG. 7B

| METHOD (ARGUMENT: CHARACTER STRING) | NORMAL LENGTH | NORMAL CHARACTERS | | ABNORMAL CHARACTERS | | |
|---|---|---|---|---|---|---|
| D | 0 TO 20 | a TO z, +, = | | tab | WHITESPACE | |
| E | 1 TO 256 | a TO z, A TO Z | | | | |

LOG OUTPUT CONDITION SETTING METHOD AND APPARATUS

CROSS-REFERENCE TO RELATED APPLICATION

This application is based upon and claims the benefit of priority of the prior Japanese Patent Application No. 2013-212334, filed on Oct. 9, 2013, the entire contents of which are incorporated herein by reference.

FIELD

The embodiments discussed herein are related to an apparatus and method with which an output condition for a log is set.

BACKGROUND

Many computers are provided with the functionality to output some form of log. The information included in logs is useful for investigating the cause of a fault when a fault has occurred, for example. However, log output processing is a type of overhead, and it is therefore undesirable to output logs that include unnecessarily large amounts of information.

Therefore, in the acquisition of logs for ascertaining the state of a system, the volume of the logs that are output is limited by a log level setting that corresponds to the objective (storage capacity, performance deterioration due to log acquisition). If a fault or the like has occurred, a detailed log (high log level) is desired, and in order to set the log level setting to the appropriate level, information such as application execution records and so forth is used.

To date, a logging system in which the portions to be output to an event log are efficiently limited and are able to be changed dynamically has been proposed (for example, Japanese Laid-open Patent Publication No. 2004-094374). In this logging system, a log management program refers to the content of a log output setting table to ascertain the call origin and the finish of a target method.

Furthermore, a logging apparatus in which data regarding checkpoints during the execution of an application program are logged in real time has been proposed (for example, Japanese Laid-open Patent Publication No. 2009-205488). In this apparatus, a log output condition that is externally preset and a plurality of log output functions that are called at the checkpoints are incorporated into the application program. Normally, a log is output only when an error level specified by a parameter of a log output function coincides with a normal log output condition. If an error level coinciding with a trigger level occurs, a detailed log of the error level, which coincides with an abnormal log output level, is output.

An information processing apparatus such as follows that executes response processing for a request output from a client computer has been proposed with the objective of increasing the operability of a server (for example, Japanese Laid-open Patent Publication No. 2012-18512).

This information processing apparatus is provided with a storage device that stores a first program for executing response processing for a request output from a client computer, and is provided with a computation processing device. When a first request is received from the client computer, this computation device duplicates a first program and the first request, executes a second program that is a duplicate of the first program, and monitors the response processing of the first program with respect to the first request. If a fault in the response processing of the first program is detected, this computation device executes the second program, and carries out response processing with respect to the second request that is a duplicate of the first request.

However, in schemes in which the output states of logs are limited in accordance with the target method and only logs for checkpoints are output, there has been a problem in that it has not been possible to obtain detailed log output in cases such as when a fault occurs due to an input value of a method or an internal state.

Furthermore, in schemes in which programs are duplicated to deal with faults, there has been a problem in that the overhead of the duplication processing is large.

Therefore, in one aspect, an objective is to make it possible for detailed logs to be output also in cases such as when a fault occurs due to an input value of a method or an internal state.

SUMMARY

According to an aspect of the invention, a log output condition setting method is disclosed. The method includes, when a call for a log acquisition target is made, acquiring a context of the call, and based on the acquired context and storage information that has stored therein information in which a context of a call for the log acquisition target and a processing result are associated, setting an output condition for a log in the log acquisition target.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3A and FIG. 3B are drawings depicting examples in which the log level is controlled according to an internal state;

FIG. 7A and FIG. 7B are drawings depicting exemplary data configurations for a value range record table;

DESCRIPTION OF EMBODIMENTS

Modes for carrying out the present technology are hereafter described in detail with reference to the drawings.

Generally, in the case where the direct cause for the occurrence of a fault is due to an input value rather than the method itself in which the fault has occurred, for example, in the case of an input value (a request parameter or an SQL statement) in a web application or database processing, if the execution record of the application is used and the log level is lowered, the log level desired for analyzing the fault is not achieved (fault occurrence circumstances differ due to external variables).

Furthermore, there are also cases where the direct cause for the occurrence of a fault is due to an internal state (for example, the state of the memory being used) handled by the method rather than the input value itself; however, from information obtained directly from outside, it is difficult to change the log level in accordance with the internal state.

In addition, there are also techniques in which all logs are output in detail and only specific logs are extracted from the detailed output in accordance with the execution results of methods; however, performance deterioration with regard to input/output and so forth caused by all logs being output in detail becomes a problem, and such techniques are not able to be easily adopted.

Figure 1:
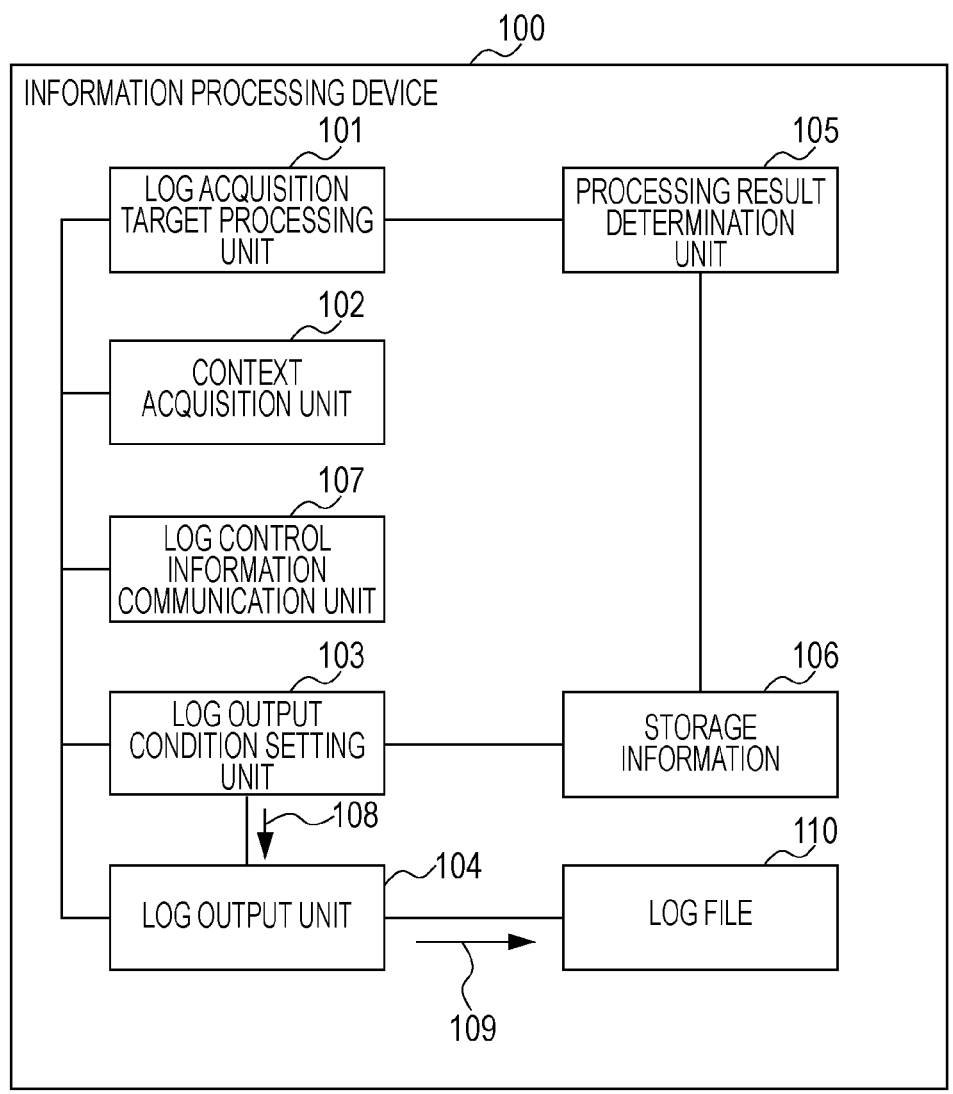
FIG. 1 is a block diagram depicting an exemplary configuration of the processing functionality of an information processing apparatus according to a first embodiment.

FIG. 1 is a block diagram depicting an exemplary configuration of the processing functionality of an information processing apparatus 100 according to a first embodiment for solving the aforementioned problems.

The information processing apparatus 100 is provided with a log acquisition target processing unit 101, a context acquisition unit 102, a log output condition setting unit 103, a log output unit 104, and a processing result determination unit 105.

The log acquisition target processing unit 101 executes and processes log acquisition targets, which are execution units in the information processing apparatus 100. A log acquisition target is, for example, any of a process, a thread, an application program, a program module, a function program, a procedure, or a method defined in a class written in an object-oriented language, which are programs that are read from an external storage device 1505 to a memory 1502 and executed by a CPU 1501 of FIG. 15 described hereafter.

When a log acquisition target is called, the context acquisition unit 102 acquires the context of the call. The context, for example, includes at least one of an input value that is passed as an argument to the log acquisition target when the log acquisition target is called, or the call route of the log acquisition target. Here, when the context is, for example, an input value for an argument of the log acquisition target, the range of that input value is determined.

Furthermore, when the context is, for example, the call route of the log acquisition target, the specific call relationship of the log acquisition target, namely which programs have been sequentially called up to the log acquisition target being called, is extracted.

Based on the acquired context and storage information 106 that has stored therein information in which the context of a call for the log acquisition target and a processing result are associated, the log output condition setting unit 103 sets an output condition 108 for a log in that log acquisition target.

Based on the output condition 108 for a log set by the log output condition setting unit 103, the log output unit 104 outputs, to a log file 110, a log 109 that corresponds to the log acquisition target executed by the log acquisition target processing unit 101.

The processing result determination unit 105 stores, in the storage information 106, information in which a processing result is associated with the context of a call.

In the configuration of FIG. 1, the information processing apparatus 100 may be provided with a log control information communication unit 107. When a log acquisition target is called from another program executed on the information processing apparatus 100 or another information processing apparatus, this log control information communication unit 107 communicates log control information that is transmitted incorporated within the call to the log acquisition target from the other program. In this case, the log output condition setting unit 103 may use this log control information to set the output condition for a log in the log acquisition target.

In this way, if a plurality of apparatuses operate in a linked manner, it is possible for a configuration to be implemented in such a way that the log level determination result (log acquisition condition) in a program of the "processing result transferring side" (log acquisition target) is transmitted as log control information to the "processing result receiving side". As a result of this, in the "processing result receiving side", it becomes possible to set a desired log level from when processing starts.

Figure 15:
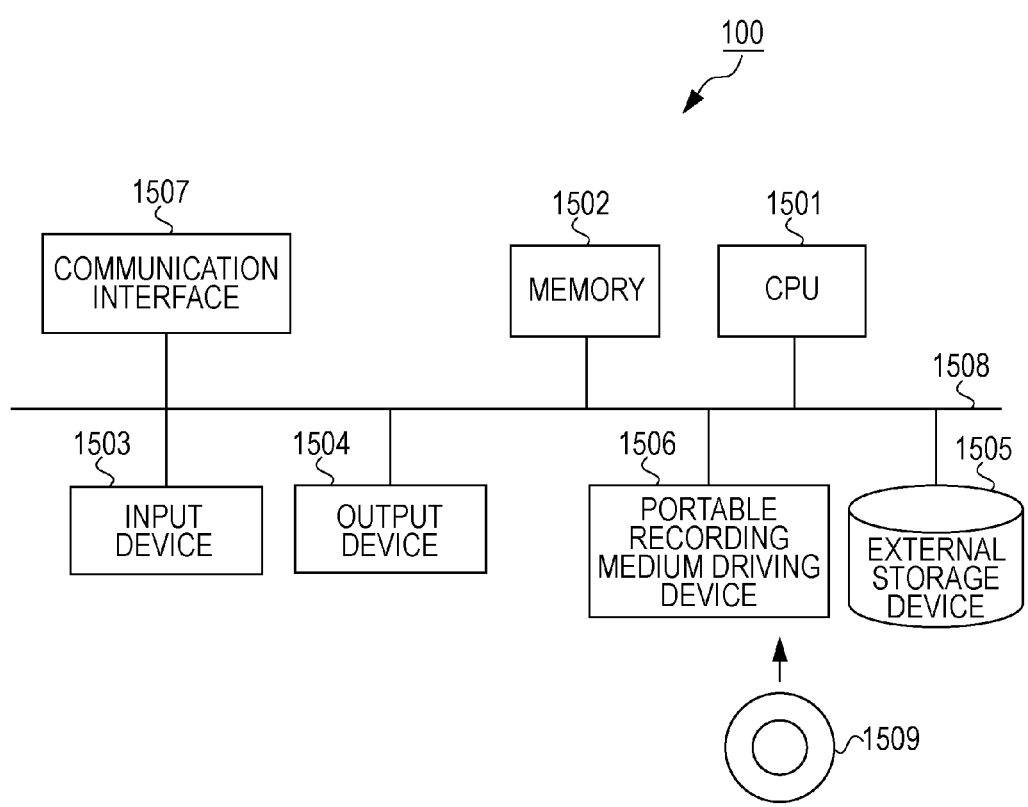
FIG. 15 is a drawing depicting an exemplary hardware configuration of the information processing apparatus according to the first embodiment.

Each processing unit of the aforementioned 101, 102, 103, 104, 105, or 107 is, for example, implemented by the CPU 1501 of FIG. 15 described hereafter executing a processing program corresponding to each processing unit that is read from the external storage device 1505 to the memory 1502.

The processing functionality of the information processing apparatus 100 having the configuration of FIG. 1 is described hereafter in detail. The processing functionality of FIG. 1 according to the first embodiment improves the accuracy of detailed log output when an abnormality occurs (or there is an indication thereof) by making it possible to appropriately change the output condition 108 for a log such as the log level, even in the case of an abnormal input value in a log acquisition target such as a method or an abnormal internal state.

For that purpose, in the processing functionality of FIG. 1 according to the first embodiment, a scheme (logic) is used in which the determination to change the output condition 108 for a log is carried out according to the dynamic context, taking the input values for arguments and the internal state such as the call route into consideration.

A log acquisition target is a method, for example. In this case, the log acquisition target processing unit 101 is a method execution unit such as a Java virtual machine (JVM; Java is a registered trademark of Oracle Corporation) processing unit. Furthermore, when a method is called, the context acquisition unit 102 acquires the context such as an input value that is passed as an argument or the call route of that method. Then, based on the aforementioned acquired context and the storage information 106 that has stored therein information in which the context of the method and a processing result such as "normal" or "abnormal" are associated, the log output condition setting unit 103 sets an output condition 108 for a log 109. This output condition 108 is, for example, a log level that indicates the degree of detail of the output of the log 109 that the log output unit 104 outputs as, for example, a log file 110 when that method is executed. Moreover, although the log level is commonly used as the output condition 108 for a log, other than this, a condition such as whether or not to output the log 109, and a condition such as the output format of the log 109 may be included.

To be more specific, if the context acquired by the context acquisition unit 102 when a method is called is, for example, an input value that is passed as an argument and the call route of that method, the log output condition setting unit 103 may carry out control such as the following, for example.

First, based on the input value and input value storage information that has stored therein information in which the input value of the method and a processing result are associated and that is part of the storage information 106, the log output condition setting unit 103 sets the output condition 108 for a log.

For example, if the value of the argument when the method is called is a primitive type (numeral or character string or the like), the log output condition setting unit 103 is able to determine the range of the value of that argument. In cases such as this, the log output condition setting unit 103 determines the range of the value of the argument, and the result of that determination is used for determining whether or not it is desirable for the log level to be changed, for example.

Figure 2A:
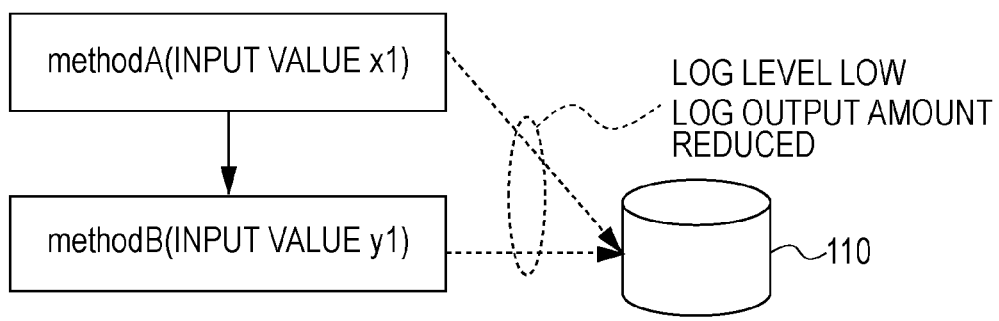
FIG. 2A and FIG. 2B are drawings depicting examples in which the log level is controlled according to an argument (input value)
Figure 2B:
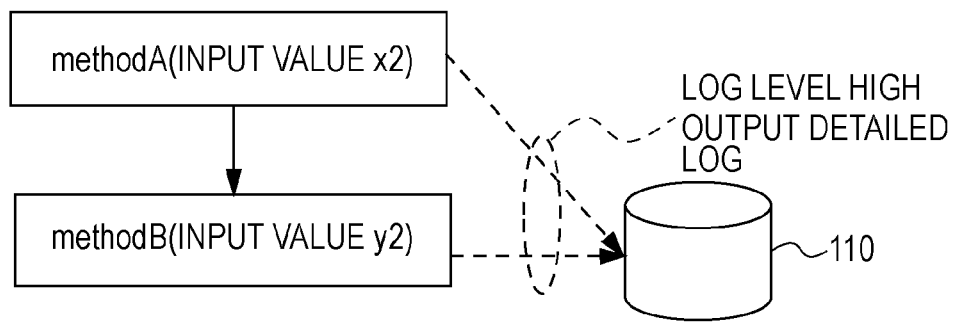

FIG. 2A and FIG. 2B are drawings depicting examples in which the log level is controlled according to an argument (input value).

As a result of referring to the input value storage information that is part of the storage information 106, if the range of the input value that is the argument is found to be within a value range having a past processing record, the log output condition setting unit 103 may perform control in a direction such that a low log level is set with respect to the log output unit 104. For example, as depicted in FIG. 2A, if the value range of an input value x1 or y1 when methodA or methodB, which are methods, is called is within a value range having a past processing record, control may be performed in a direction such that the log level becomes low. As a result, the log output amount in the log file 110 is reduced.

Conversely, if the range of an input value that is an argument is within a value range that does not have a past processing record, the log output condition setting unit 103 may perform control in a direction such that a high log level is set with respect to the log output unit 104. For example, as depicted in FIG. 2B, if the value range of an input value x2 or y2 when methodA or methodB is called is within a value range that does not have a past processing record, control may be performed in a direction such that the log level becomes high. As a result, a detailed log is output to the log file 110.

Generally, if the range of an input value when a method is called is within a value range that does not have a past processing record, the possibility of that input value being an abnormal value is high, and it is conceivably possible that the probability of an error occurring if the log acquisition target processing unit 101 executes that method may increase. Consequently, if the range of an input value when a method is called is within a value range that does not have a past processing record, by performing control in a direction such that the log level becomes high, it becomes possible to acquire a more detailed log 109 when an error occurs.

Next, there are cases where reference is made to the input value storage information that has associated therein the input value of a method and a processing result and that is part of the storage information 106, and it is not possible to set the output condition 108 for a log.

For example, if the value of an argument when a method is called is not a primitive type such as a numeral or a character string, or the value of the argument is a character string but the format thereof is complex, or the value of the argument is not passed as a direct argument, it is not possible to make a determination by using the input value. Examples of such cases are when the argument is an SQL statement for searching a database, and when the argument is a pointer value that refers to another variable, and so forth.

In order for it to also be possible to set the output condition 108 for a log in these kinds of cases, the log output condition setting unit 103 refers to call route storage information that has stored therein information in which the call route of a method and a processing result are associated and that is part of the storage information 106, to determine the call route of the method that has been called.

If it has been possible to determine the range of the input value of a method, the log output condition setting unit 103 uses both that determination result and the aforementioned call route determination result to set the output condition 108 for a log. However, if it has been not possible to determine the range of the input value of a method, the log output condition setting unit 103 uses only the aforementioned call route determination result to set the output condition 108 for a log.

Alternatively, the log output condition setting unit 103 may carry out control such as the following. The log output condition setting unit 103 refers to the input value storage information and attempts to set the output condition 108 for a log. However, if this setting is not possible, reference is made to the call route storage information of the method that has been called, and the output condition 108 for a log is set.

As the call route of the method, not only the connection relationship between the call-origin method and the call destination (called) method, but also the call route from the start of that series of processing to a certain point in time is used. It is possible for this kind of call route to be acquired by referring to the call stack, for example. It also goes without saying that the call route of a method may be acquired by using a method other than using the call stack.

As a result of referring to the call route storage information that is part of the storage information 106, if the call route of the method that has been called is found to be a route having a past call record, the log output condition setting unit 103 performs control in a direction such that a low log level is set for the log output unit 104. FIG. 3A and FIG. 3B are drawings depicting examples in which the log level is controlled according to the internal state. For example, as depicted in FIG. 3A, as a result of referring to the call route storage information, if the call route of methodB from methodA in a certain internal state α is found to have a past call record, control is performed in a direction such that the log level, which is the output condition 108 for a log, becomes low. As a result, the log output amount in the log file 110 is reduced.

Conversely, if the call route of the method that is called is a route that does not have a past call record, the log output condition setting unit 103 performs control in a direction such that a high log level is set for the log output unit 104. For example, as depicted in FIG. 3B, a case is considered such as when, in a separate internal state β that is different from the internal state α, subMethodC is called from methodA and an internal state γ is reached, and thereafter methodB is called from methodA. In this case, as a result of referring to the call route storage information, if the call route of methodA→subMethodC is found to not have a past call record, the log level, which is the output condition 108 for a log at the point in time at which subMethodC is called, becomes high. Similarly, as a result of referring to the call route storage information, if the call route of methodA→subMethodC→methodB is also found to not have a past call record, the log level, which is the output condition 108 for a log at the point in time at which methodB is called, becomes high. In these cases, a detailed log is output to the log file 110.

Generally, if a method is called by a call route that is different from normal, the possibility of there being an abnormal internal state is high, and it is conceivably possible that the probability of an error occurring if the log acquisition target processing unit 101 executes that method may increase. Consequently, if the call route of the method does not have a past call record, by performing control in a direction such that the log level becomes high, it becomes possible to acquire a more detailed log 109 when an error occurs.

As mentioned above, in the processing functionality of FIG. 1 according to the first embodiment, the determination to change the output condition 108 for a log is carried out according to the dynamic context, which takes the input values for arguments and the internal state such as the call route into consideration. As a result of this, it becomes possible to raise the log level when an abnormal input value or an abnormal internal state occurs, and it becomes possible to improve the accuracy of detailed log output when an abnormality occurs (or there is an indication thereof).

In the processing functionality of FIG. 1 according to the first embodiment, the log output condition setting unit 103 is able to perform control for how to combine the determination result regarding the range of the input value for an argument and the determination result regarding the call route to set the output condition 108 for a log such as the log level, or is able to adopt various combinations other than the aforementioned combination.

Here, in reality, in the processing of a program such as a method, for example, the transfer of processing results is often carried out between programs (including between processes and between computers and so forth) rather than just within one program. At such times, if it is possible to determine the ranges of input values for information (arguments) that is transferred, in the program at the processing result receiving side, the high/low determination for the log level is able to be carried out immediately by determining the range of an input value for an argument. That is, if there is a possibility (indication) of an abnormality occurring, it is possible to set a high log level from the point in time at which the processing of the program is started. However, if it is not possible to determine the ranges of input values for information (arguments) that is transferred, the log level remains low until the internal state of the program at the processing result receiving side becomes a state being called by a call route "that does not have a past call record".

In order to solve this problem, the log control information communication unit 107 may be provided in the processing functionality of FIG. 1 according to the first embodiment. For example, when a method is called from another program (a method, for example) executed on the computer of the information processing apparatus 100 itself or another computer, the log control information communication unit 107 transmits log control information incorporated within the call to the method from the other program. The log output condition setting unit 103 then uses that log control information to decide the output condition 108 for a log in the called method, and performs setting with respect to the log output unit 104.

Figure 4:
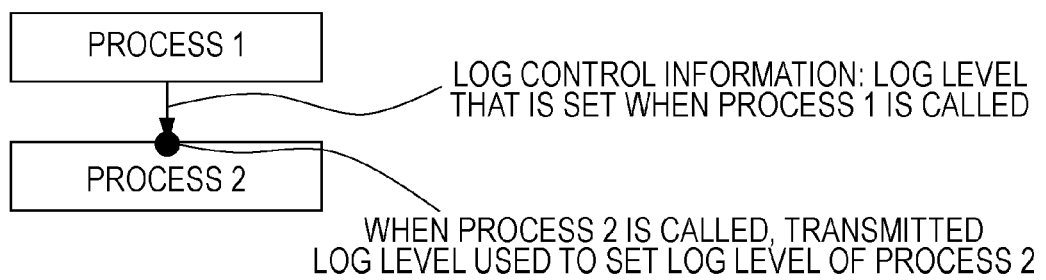
FIG. 4 is a drawing depicting an example in which log control information is transmitted between processes to control the log level.

The log control information, for example, may be a log level (output condition for a log) that is set in a process 1 (other program) constituting the call origin. FIG. 4 is a drawing depicting an example in which log control information is transmitted between processes to control the log level. In this case, the log output condition setting unit 103 compares a log level that has been provisionally set corresponding to a called process 2 (log acquisition target) and a log level that has been set by the process 1 and transmitted from the process 1, and sets a final log level in the process 2. To be more specific, from among the log level provisionally set corresponding to the process 2 and the log level transmitted from the process 1, the log output condition setting unit 103 sets the higher log level as the final log level.

Alternatively, the log control information, for example, may include the process that is the call origin or the call route of a method (other program). In this case, the log output condition setting unit 103 executes the following control when a process or a method (log acquisition target) is called. The log output condition setting unit 103 adds the call route of the call-origin process or method transmitted from the call-origin process or method, to the head of the call route of the called process or method, and uses the resulting call route as a new call route. The log output condition setting unit 103 then sets the log level by determining whether or not that new call route is included in call route storage information in which the call route of the called process or method and a processing result are associated.

As mentioned above, in the processing functionality of FIG. 1 according to the first embodiment, the log level and so forth in the called method and so forth is set taking the log level corresponding to the call-origin method and so forth and the call route and so forth into consideration. As a result of this, it is possible to transmit the occurrence of an abnormality (or the indication thereof) across programs (processes, machines), and it becomes possible to capture the occurrence (or indication) of abnormalities across the entire information processing system and improve the accuracy of detailed log output.

In addition, the log acquisition target that is called and the call-origin program may be processes, threads, or methods that are executed on the same information processing apparatus 100 (machine), or may be processes that are executed on different information processing apparatuses 100 (machines).

If the call-origin log level is transmitted between different information processing apparatuses 100, the processing functionality of FIG. 1 may be provided in each information processing apparatus 100, and the call-origin log level may also be set by using the processing functionality of FIG. 1. In this case, log control information such as the log level and the call route and so forth is transmitted from the log control information communication unit 107 of the call-origin information processing apparatus 100 to the log control information communication unit 107 of the call-destination information processing apparatus 100.

If log control information is transmitted on the same information processing apparatus 100, the context acquisition unit 102 of the processing functionality of FIG. 1, for example, which is added to a JVM processing unit as a part thereof or as middleware, may acquire each process, thread, or method of the call origin and the call destination. The log control information communication unit 107 then transfers log levels and call routes, which are log control information, among each process, thread, or method of the call origin and the call destination.

Figure 5:
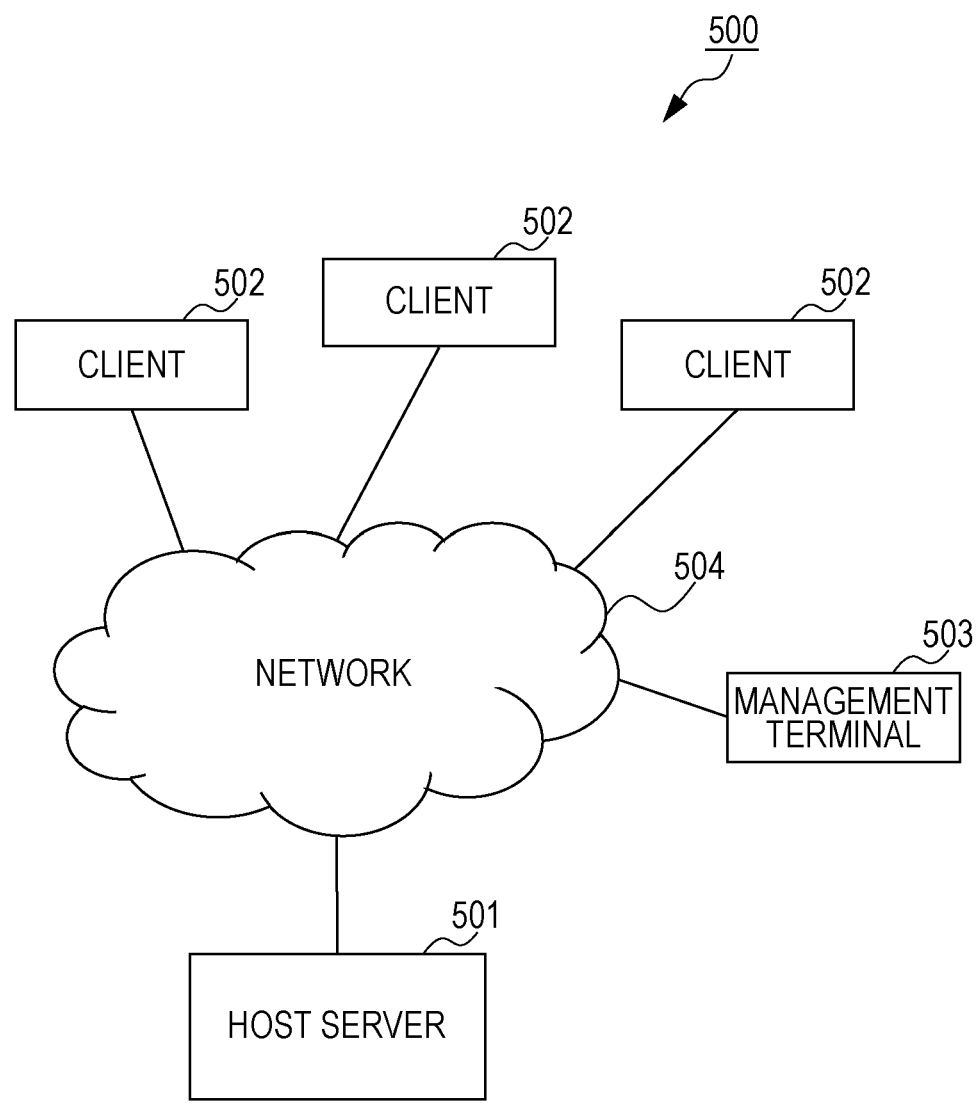
FIG. 5 is a drawing depicting an exemplary system configuration of an information processing system according to second and third embodiments.

FIG. 5 is a drawing depicting an exemplary system configuration of an information processing system according to second and third embodiments. In these embodiments, processing functionality that is the same as the processing functionality of the information processing apparatus according to the first embodiment depicted in FIG. 1 is implemented as a host server 501 that implements a virtual machine.

An information processing system 500 has a configuration in which a host server 501, a plurality of clients 502, and a management terminal 503 are connected to each other by a network 504. Moreover, any of the host server 501, the clients 502, and the management terminal 503 are able to be implemented as computers having an exemplary hardware configuration such as that depicted in FIG. 15 described hereafter.

The host server 501 builds a JVM and executes various application programs on the JVM, and thereby provides various services to each client 502.

The clients 502 are user operated terminal devices that receive the services provided by the host server 501 and access the host server 501 in accordance with user operations.

The management terminal 503 is a terminal device that is operated by the administrator of the host server 501. The management terminal 503, for example, accesses the host server 501 in accordance with an operation from the administrator, reads a log file recorded in the host server 501, and displays a log on a display device (a display device forming part of an output device 1504 of FIG. 15 described hereafter, for example). Based on the displayed log, the administrator is able to deal with a fault that has occurred in the host server 501.

Figure 6:
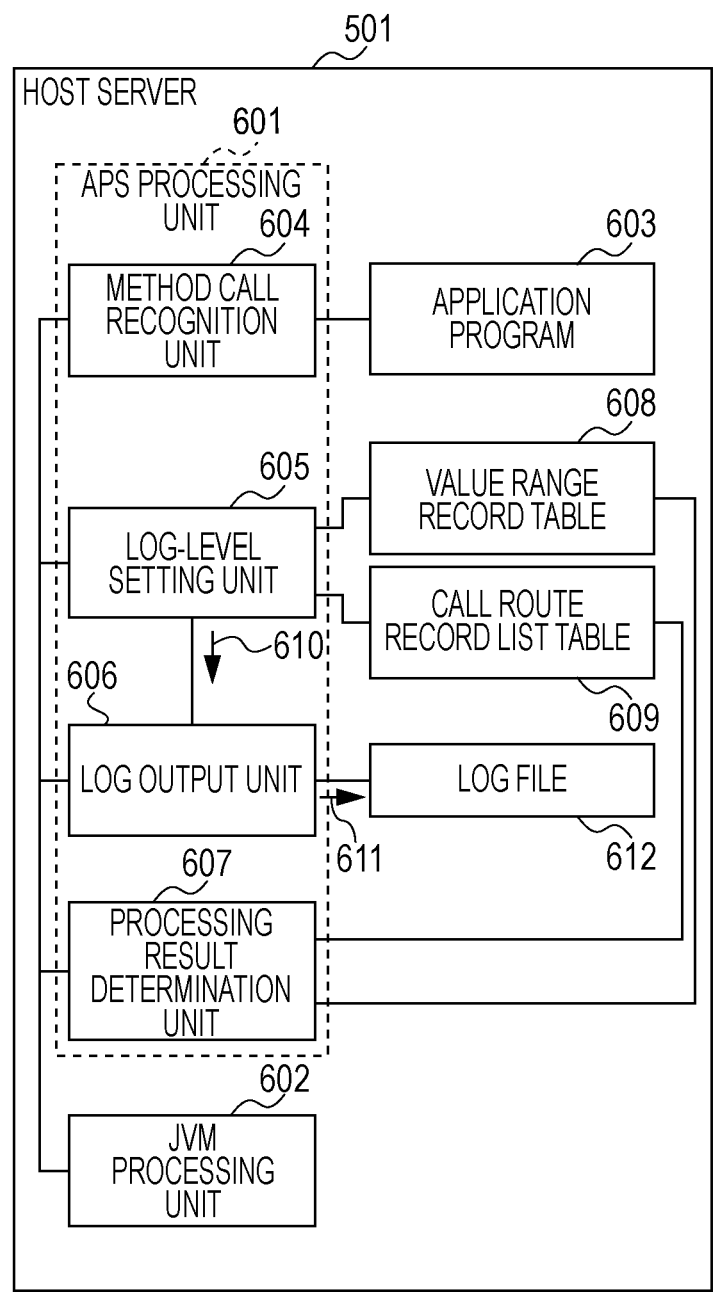
FIG. 6 is a block diagram depicting an exemplary configuration of the processing functionality of a host server according to the second embodiment.

FIG. 6 is a block diagram depicting an exemplary configuration of the processing functionality of the host server 501 of FIG. 5 according to the second embodiment.

The host server 501 is provided with an application server (APS) processing unit 601 and a JVM processing unit 602. Furthermore, an application program 603, a value range record table 608, a call route record list table 609, and a log file 110 are stored in a storage device (an external storage device 1505 or a memory 1502 of FIG. 15 described hereafter, for example) of the host server 501.

The application program 603 corresponds to the log acquisition target in the exemplary configuration of the processing functionality of FIG. 1 according to the first embodiment. The application program 603 is executed on a Java virtual machine constituted by the JVM processing unit 602.

The processing of the JVM processing unit 602 is implemented by, on the host server 501, a processor (a CPU 1501 of FIG. 15 described hereafter, for example) reading a JVM processing program from an external storage device (the external storage device 1505 of FIG. 15 described hereafter, for example) to a memory (the memory 1502 of FIG. 15 described hereafter, for example) and executing the JVM processing program. The JVM processing unit 602 corresponds to the log acquisition target processing unit 101 of FIG. 1 according to the first embodiment, and executes processing as a Java virtual machine. The JVM processing unit 602, via the APS processing unit 601, acquires and executes the source code or the native code of the application program 603, and executes processing as a Java virtual machine according to the application program 603. If the application program 603 is in source code, the JVM processing unit 602 uses an interpreter system to sequentially interpret and execute intermediate code (byte code) obtained by converting the application program 603. If the application program 603 is in native code, the JVM processing unit 602 directly executes that native code. Moreover, in accordance with the execution state, the JVM processing unit 602 compiles a predetermined range of the intermediate code of the application program 603 that is in source code by using an internal just-in-time (JIT) compiler that is not specifically depicted, into native code and then executes the native code. The native code of the application program 603 generated in this manner is stored in a storage device and reused as desired.

The processing of the APS processing unit 601 is implemented by, on the host server 501, a processor reading an APS processing program from an external storage device to a memory, and executing the APS processing program. The APS processing unit 601 may be implemented as part of a Java virtual machine, or may be implemented as middleware added onto a Java virtual machine. The APS processing unit 601 monitors the execution state of the application program 603 on a Java virtual machine, and outputs a log 611 to a log file 612. The APS processing unit 601 is provided with a method call recognition unit 604, a log-level setting unit 605, a log output unit 104, and a processing result determination unit 105.

The method call recognition unit 604 corresponds to the context acquisition unit 102 of FIG. 1 according to the first embodiment. The method call recognition unit 604 recognizes and acquires a call for a method, which is an execution unit of the application program 603, and an input value that is passed as an argument to that method.

The log-level setting unit 605 corresponds to the log output condition setting unit 103 of FIG. 1 according to the first embodiment. The log-level setting unit 605 refers to a value range record table 608 and a call route record list table 609 to determine the argument input value and call route of the method for which the method call recognition unit 604 acquired a call. As a result of this, the log-level setting unit 605 decides a log level 610 that corresponds to that method, and performs setting with respect to a log output unit 606.

The value range record table 608 and the call route record list table 609 correspond to the storage information 106 of FIG. 1 according to the first embodiment. The storage information 106 is, for example, input value storage information and call route storage information.

The log output unit 606 corresponds to the log output unit 104 of FIG. 1 according to the first embodiment. At the log level 610 set by the log-level setting unit 605, the log output unit 606 outputs, to the log file 612, a log 611 that corresponds to the method of the application program 603 being executed by the JVM processing unit 602.

The processing result determination unit 607 corresponds to the processing result determination unit 105 of FIG. 1 according to the first embodiment. The processing result determination unit 607 stores (reflects) the argument input value of the called method and a processing result (normal/abnormal) in the value range record table 608. Furthermore, the processing result determination unit 607 stores the call route of the called method and the processing result (normal/abnormal) in the call route record list table 609.

FIG. 7A and FIG. 7B are drawings depicting exemplary data configurations for the value range record table 608 of FIG. 6.

The value range record table 608 is configured so as to include, as a first context set, the normal value range depicted in FIG. 7A, or the normal length and normal characters depicted in FIG. 7B. For example, there is a method that has been called once or more in the past, and the first context set is determined based on input values for arguments of the call, from among the past calls made once or more, which has produced a normal processing result, where the input values for the arguments constitute a context in each call for that method.

If the input value for the argument of each method is a numeral, the normal value range that indicates the range of normal values therefor is, as exemplified in FIG. 7A, registered in the value range record table 608 and expanded in accordance with the following steps 1 to 5, for example.

1. First time: no range
2. 0 is processed→0 is registered
3. −5 is processed→normal value range expanded to −5 to 0
4. 4 is processed→normal value range expanded to −5 to 4
5. 2012 is processed→normal value range expanded to −5 to 2012

In the example of FIG. 7A, with regard to method A, if the input value for the argument is the integer value 0, the state when method A is called may be determined as being normal. Furthermore, with regard to method B, if the input value for the argument is within the range from the integer value −5 to 1024, the state when method B is called may be determined as being normal. In addition, with regard to method C, if the input value for the argument is within the range from the integer value 1 to 65535, the state when method C is called may be determined as being normal.

Furthermore, if the argument is a character string, the length with which processing results have been normal, and the character types (value ranges as characters) that have been able to be processed as normal are, as exemplified in FIG. 7B, registered in the value range record table 608. In the example of FIG. 7B, when method D is called, if the input character string for the argument has a length within the range of 0 to 20 characters and includes only any of the lowercase alphabet characters from "a" to "z", the "+" character, or the "=" character, the state when method D is called may be determined as being normal. Furthermore, when method E is called, if the input character string for the argument has a length within the range of 1 to 256 characters and includes only any of the lowercase alphabet characters from "a" to "z" or the uppercase alphabet characters from "A" to "Z", the state when method E is called may be determined as being normal.

The value range record table 608 is configured so as to include, as a second context set, the abnormal value range depicted in FIG. 7A or the abnormal characters depicted in FIG. 7B in addition to the aforementioned first context set. The second context set is determined based on input values for arguments of a method that has been called in the past for example, where the input values for the arguments constitute a context in each call that, from among the past calls made once or more for that method, has produced an abnormal processing result. If the input value for the argument of each method is a numeral, the abnormal value range that indicates the range of abnormal values therefor is, as exemplified in FIG. 7A, chained in a list format, registered, and expanded. In the example of FIG. 7A, an abnormal value range is not registered for method A. With regard to method B, if the input value for the argument is the integer value 0 or 256, the state when method B is called may be determined as being abnormal, even if these values are within the normal value range. With regard to method C, if the input value for the argument is the integer value 0, the state when method C is called may be determined as being abnormal.

Furthermore, if the argument is a character string, the length with which the processing result has been abnormal, and the character types (value ranges as characters) that have been abnormally processed are, as exemplified in FIG. 7B, registered in the value range record table 608. In the example of FIG. 7B, when method D is called, if the input character string for the argument includes either the "tab" character or the "whitespace" character, the state when method D is called may be determined as being abnormal.

Figure 8A:
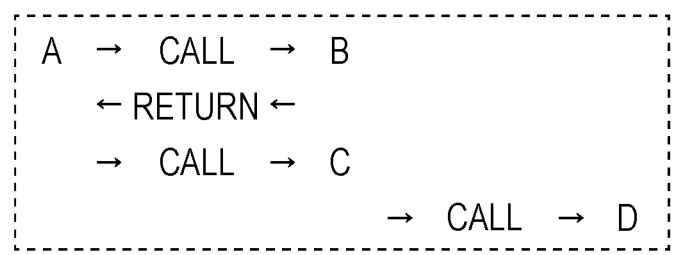
FIG. 8A and FIG. 8B are drawings depicting exemplary data configurations for a call route record list table.
Figure 8B:

FIG. 8A and FIG. 8B are drawings depicting exemplary data configurations for a call route record list table.

The call route record list table 609 is configured so as to include, as the first context set, a normal call route such as that depicted in FIG. 8B. The first context set is a set of call routes for a method that has been called in the past for example, where the call routes for that method constitute a context in each call that, from among the past calls made once or more for that method, has produced a normal processing result.

Any of the following call route information may be registered as a normal call route.

<Call route information 1>: The call stack for a method at that point in time: abnormality detection accuracy is poor but the size of the list to be managed is comparatively small.

<Call route information 2>: The history of a method call at that point in time: abnormality detection accuracy is comparatively high but the size of the list to be managed becomes large.

For example, if method calls are carried out in the order of method A, B, C, and D as depicted in FIG. 8A, at the point in time at which method D is called, the call route becomes as follows.

In the case of call route information 1: ACD
In the case of call route information 2: ABB return CD To be specific, an example of the call route record list that is registered in the call route record list table 609 is as depicted in FIG. 8B if the call route information 2 is used. If the call route is any of "ACD", "ABB return CD", or "ABB return BB return CD", those method calls may be determined as being normal.

In addition, it is conceivable that the call route record list may become very large if all method calls are targeted. In such cases, a mechanism that suppresses the increase in the size of the list by limiting the methods that are targeted may be provided. For example, in the case of Java, a limit implemented by using the package name (methods of classes of java.xx and com.***.xx are not targeted, or methods of classes of a specific package name are targeted) may be provided. Furthermore, a limit implemented by using a library (jar: Java archive) name may be provided. In addition, in the case of a native library, it is possible to use a module name (dynamic link name: xx.dll, shared object name: xx.so, and so forth) or the like to determine whether or not to target certain methods.

Furthermore, depending on program characteristics, there are cases where the occurrence of an exception is not necessarily an abnormality. It is also possible to adopt a scheme in which information according to the execution count and frequency for each call route is added to the call route record list table 609, and the log level is switched in accordance with those values (threshold values).

In addition, the call route record list table 609 may be configured so as to include abnormal call routes as the second context set. The second context set is a set of call routes for a method that has been called in the past for example, where the call routes for that method constitute a context in each call that, from among the past calls made once or more for that method, has produced an abnormal processing result.

Figure 9:
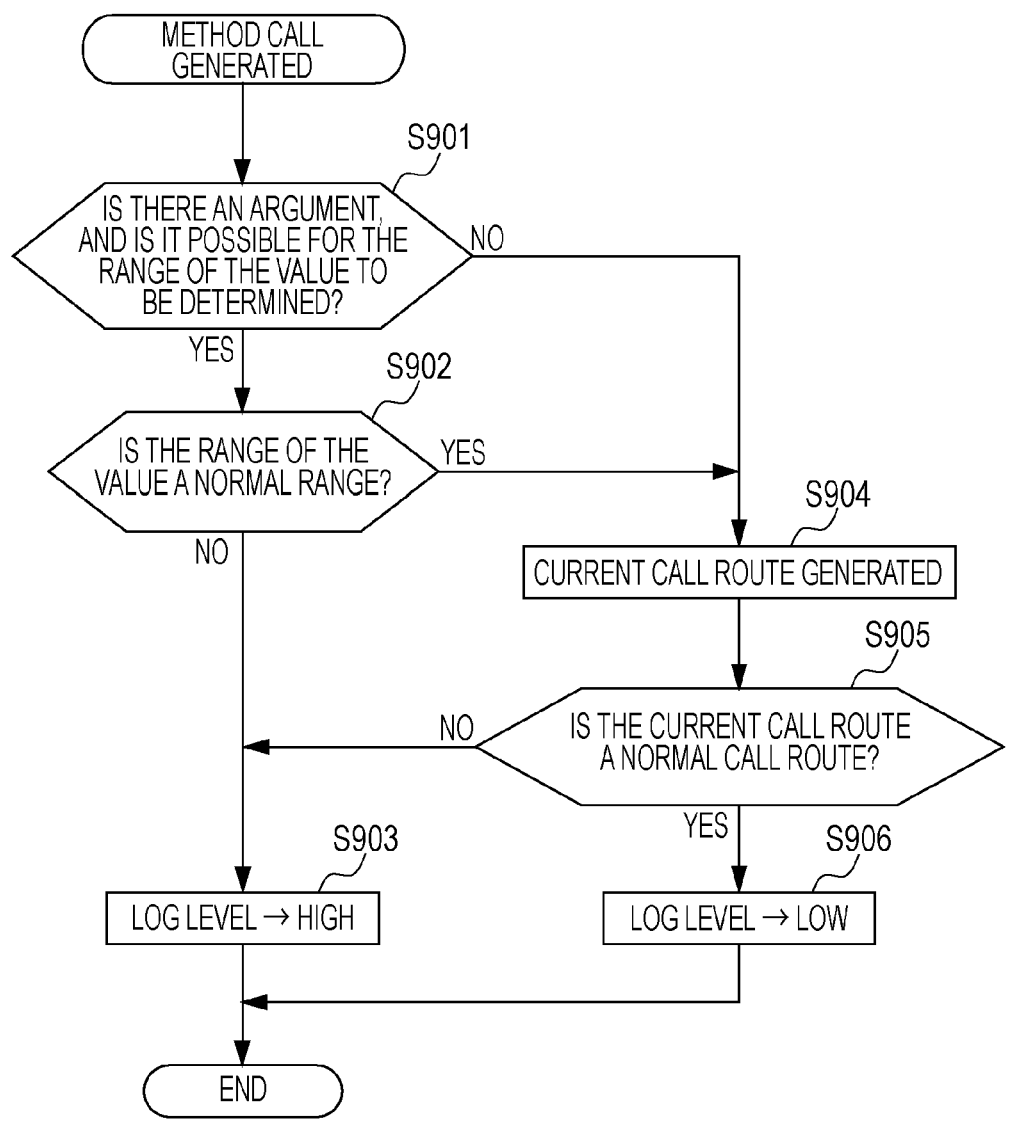
FIG. 9 is a flowchart depicting exemplary processing of a log-level setting unit.
Figure 10:
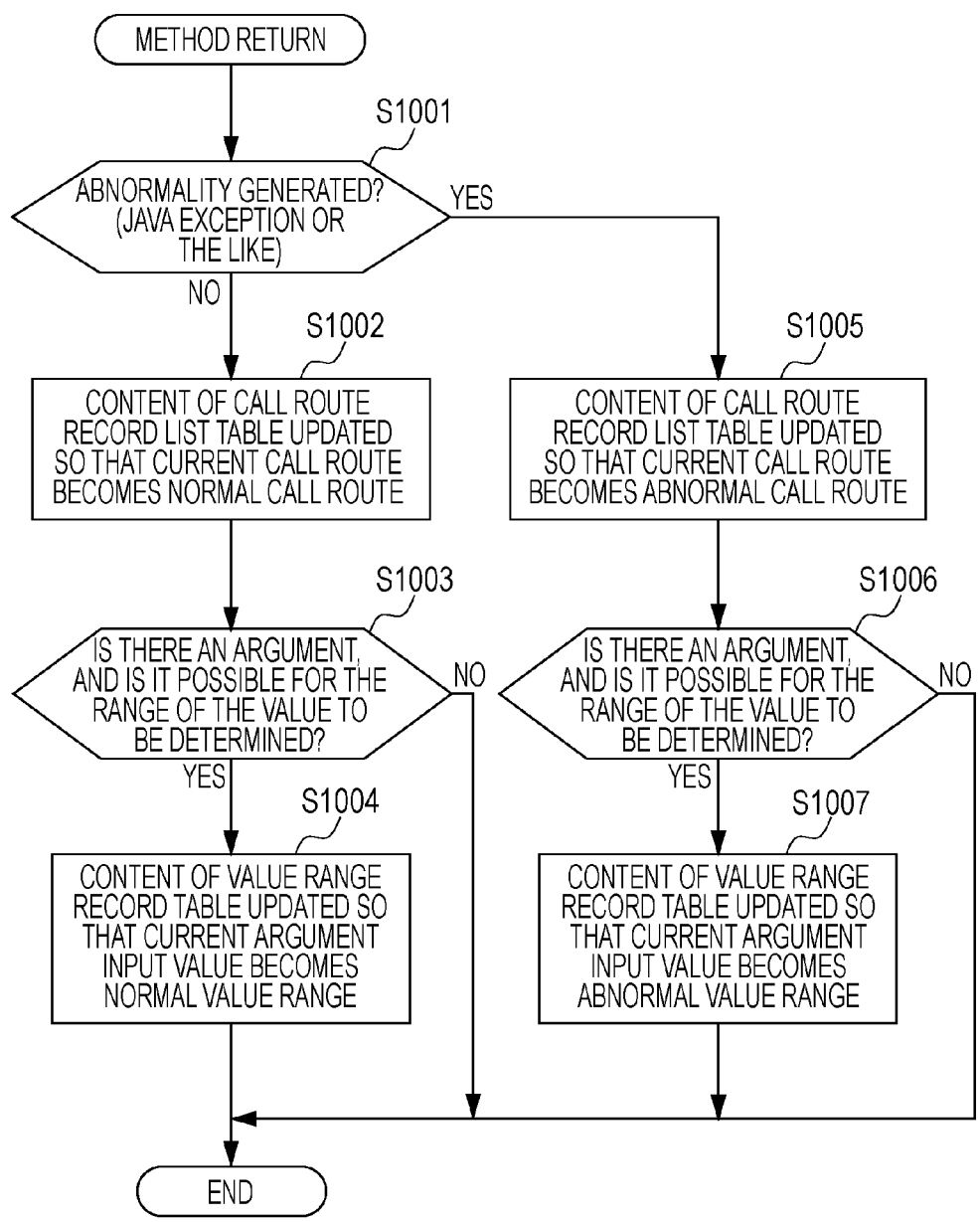
FIG. 10 is a flowchart depicting exemplary processing of a processing result determination unit.

The operation of the APS processing unit 601 of FIG. 6 in which the value range record table 608 and the call route record list table 609 having the exemplary configurations exemplified in FIG. 7A, FIG. 7B, FIG. 8A, and FIG. 8B are used is hereafter described in detail using the flowcharts of FIG. 9 and FIG. 10.

FIG. 9 is a flowchart depicting exemplary processing of the log-level setting unit 605 of FIG. 6. This exemplary processing is processing in which, for example, the CPU 1501 of FIG. 15, which forms part of the host server 501 of FIG. 5 and is described hereafter, reads a log-level setting processing program from the external storage device 1505 to the memory 1502 and executes the log-level setting processing program.

The processing of the flowchart of FIG. 9 is carried out when the method call recognition unit 604 of FIG. 6 acquires a method call, immediately prior to the execution of the method by the JVM processing unit 602 of FIG. 6 starting.

First, a determination is made as to whether or not there is an argument in the called method, and with regard to the input value thereof, whether or not it is possible for the value range to be determined using the value range record table 608 (step S901).

If the input value is a primitive type (numeral or character string or the like), it is possible to determine the range thereof, and the determination made in step S901 is "yes", by referring to the value range record table 608 exemplified in FIG. 7A or 7B, it is determined whether or not the range of the input value for the argument is within the normal value range (step S902).

If the value range record table 608 (corresponding to the storage information 106 of FIG. 1) has been configured so as to include a normal value range, a normal length, or normal characters (see FIG. 7A and FIG. 7B) constituting the first context set, control such as the following is carried out in the determination made in step S902. If the input value for the argument of the method is not included in the normal value range, control is performed in a direction such that the log level (degree of detail of the log) becomes higher than when an input value is included in the normal value range.

Furthermore, if the value range record table 608 has been configured so as to include an abnormal value range or abnormal characters (see FIG. 7A and FIG. 7B) constituting the second context set, control such as the following is carried out in the determination made in step S902. If the input value for the argument of the method is included in the abnormal range, control is performed in a direction such that the log level (degree of detail of the log) becomes higher than when an input value is not included in the abnormal range.

If the aforementioned determination is carried out in step S902, and the input value for the argument is not included in the normal value range and the determination made in step S902 is "no", the log level 610 that is set in the log output unit 606 is set to a high level (in such a way that the degree of detail of the log 611 becomes high) (step S903).

If the input value for the argument is included in the normal value range and the determination made in step S902 is "yes", there remains a possibility of the log level 610 that is set in the log output unit 606 being set to a low level (in such a way that the degree of detail of the log 611 becomes low). In this case, in addition, processing advances to the processing of step S904 in order to carry out a determination by using the call route.

Furthermore, in the aforementioned step S901, if the input value for the argument is not a primitive type such as a numeral or a character string or the like, or the input value for the argument is a character string but the format thereof is complex, or the value is not passed as a direct argument, it is not possible to make a determination by using the value range record table 608; for example, when the argument is an SQL statement for searching a database, or when the argument is a pointer value that refers to another variable. As a result, if the determination made in step S901 is "no", processing advances to the processing of step S904 in order to carry out a determination by using the call route.

In step S904, first, the call route of the current method is generated. Here, as previously mentioned in the description of FIG. 8A and FIG. 8B, the call route is generated with reference being made to the content of the call stack for the method at that point in time, or the content of the call history.

Next, by referring to the call route record list table 609 exemplified in FIG. 8B, it is determined whether or not the call route generated in step S904 is included in the normal call route (step S905).

If the call route record list table 609 (corresponding to the storage information 106 of FIG. 1) has been configured so as include normal call routes constituting the first context set, control such as the following is carried out in the determination made in step S905. If the call route generated in step S904 is not included in the set of normal call routes constituting the first context set, control is performed in a direction such that the log level (degree of detail of the log) becomes higher than when a generated call route is included in the set of normal call routes.

Furthermore, if the call route record list table 609 has been configured so as include abnormal call routes constituting the second context set, control such as the following is carried out in the determination made in step S905. If the call route generated in step S904 is included in the set of abnormal call routes constituting the second context set, control is performed in a direction such that the log level (degree of detail of the log) becomes higher than when a generated call route is not included in the set of abnormal call routes.

If the aforementioned determination is carried out in step S905, and the call route at that point in time is not included in the normal call routes and the determination made in step S905 is "no", the log level 610 that is set in the log output unit 606 is set to a high level (in such a way that the degree of detail of the log 611 becomes high) (step S903).

However, if the call route at that point in time is included in the normal call routes and the determination made in step S905 is "yes", the log level 610 that is set in the log output unit 606 is set to a low level (in such a way that the degree of detail of the log 611 becomes low) (step S906).

After the setting processing for the log level 610 of step S903 or S906, the processing of the flowchart of FIG. 9 finishes, and the processing of the log-level setting unit 605 of FIG. 6 finishes.

As mentioned above, the log-level setting unit 605 of FIG. 6 is able to combine the determination result regarding the range of the input value for the argument for which the value range record table 608 is used, and the determination result regarding the call route for which the call route record list table 609 is used, to decide the log level 610. In other words, the log level 610 is decided based on a dynamic context that takes the input values for arguments and the internal state such as the call route into consideration. As a result of this, it becomes possible to raise the log level 610 when an abnormal input value or an abnormal internal state occurs, and it becomes possible to improve the accuracy of detailed log output when an abnormality occurs (or there is an indication thereof).

FIG. 10 is a flowchart depicting exemplary processing of the processing result determination unit 607 of FIG. 6.

This exemplary processing is processing in which, for example, the CPU 1501 of FIG. 15 that forms part of the host server 501 of FIG. 5 and is described hereafter reads a processing result determination processing program from the external storage device 1505 to the memory 1502 and executes the processing result determination processing program.

The processing of the flowchart of FIG. 10 is carried out when the execution of a method of the application program 603 by the JVM processing unit 602 of FIG. 6 is completed, immediately prior to control being returned to the call-origin method.

First, in the JVM processing unit 602 of FIG. 6, it is determined whether or not an abnormality such as a Java exception has occurred (step S1001).

If an abnormality has not occurred and the determination made in step S1001 is "no", the content of the call route record list table 609 exemplified in FIG. 8B is updated in such a way that the current call route becomes a normal call route (step S1002). To be specific, the current call route is additionally registered in the set of normal call routes constituting the first context set in the call route record list table 609. Furthermore, if the call route record list table 609 retains a set of abnormal call routes constituting the second context set, the content thereof is updated in such a way that the current call route is excluded from the set of abnormal call routes constituting the second context set.

Thereafter, a check is performed as to whether or not it has been determined in step S901 of FIG. 9 performed by the log-level setting unit 605 of FIG. 6 that there is an argument in the called method, and with regard to the input value thereof, that it is possible for the value range to be determined using the value range record table 608 (step S1003). This check, for example, is able to be performed by retaining the result of the determination processing of step S901 of FIG. 9 performed by the log-level setting unit 605, in the memory 1502 of FIG. 15 that forms part of the host server 501 and is described hereafter for example, and referring thereto.

If the determination made in step S1003 is "yes", the content of the value range record table 608 exemplified in FIG. 7A and FIG. 7B is updated in such a way that the current argument input value becomes the normal value range (step S1004). To be specific, the normal value range of the first context set is enlarged and updated in such a way that the input value for the argument is included in the normal value range constituting the first context set in the value range record table 608. Furthermore, if the value range record table 608 retains the abnormal value range constituting the second context set, the abnormal value range of the second context set is reduced and updated in such a way that the range of the input value for the argument is excluded from the range of the second context set.

However, if an abnormality has occurred and the determination made in step S1001 is "yes", the content of the call route record list table 609 exemplified in FIG. 8B is updated in such a way that the current call route becomes an abnormal call route (step S1005). To be specific, that content is updated in such a way that the current call route is excluded from the set of normal call routes constituting the first context set in the call route record list table 609. Furthermore, if the call route record list table 609 retains a set of abnormal call routes constituting the second context set, the current call route is additionally registered in the set of abnormal call routes constituting the second context set.

Thereafter, a check that is the same as that of step S1003 is performed. A check is performed as to whether or not it has been determined in step S901 of FIG. 9 performed by the log-level setting unit 605 of FIG. 6 that there is an argument in the called method, and with regard to the input value thereof, that it is possible for the value range to be determined using the value range record table 608 (step S1006).

If the determination made in step S1006 is "yes", the content of the value range record table 608 exemplified in FIG. 7A and FIG. 7B is updated in such a way that the current argument input value becomes the abnormal value range (step S1007). To be specific, the normal value range of the first context set is reduced and updated in such a way that the input value for the argument is excluded from the normal value range constituting the first context set in the value range record table 608. Furthermore, if the value range record table 608 retains the abnormal value range constituting the second context set, the abnormal value range of the second context set is enlarged and updated in such a way that the range of the input value for the argument is included in the range of the second context set.

After the determination made in step S1003 or S1006 has become "no", and after the processing of step S1004 or S1007, the processing of the flowchart of FIG. 10 finishes, and the processing of the processing result determination unit 607 of FIG. 6 finishes.

In the aforementioned processing, the current call route that is set in step S1002 or S1005 is acquired as follows. In the log-level setting processing of FIG. 9 executed by the log-level setting unit 605 of FIG. 6 when a method call occurs, if generation processing for the current call route is being executed in step S904, the current call route is retained in the memory (the memory 1502 of FIG. 15 described hereafter) and reference is made thereto. However, if step S904 is not being executed, processing that is the same as that of step S904 is newly executed, and the current call route is generated and used.

If the first or second context set in the value range record table 608 or the call route record list table 609 is updated, a configuration may be implemented in which, rather than being updated immediately after an update condition such as that previously mentioned has been satisfied once, the first or second context set is updated if the update condition has been satisfied a predetermined number of times.

Figure 11:
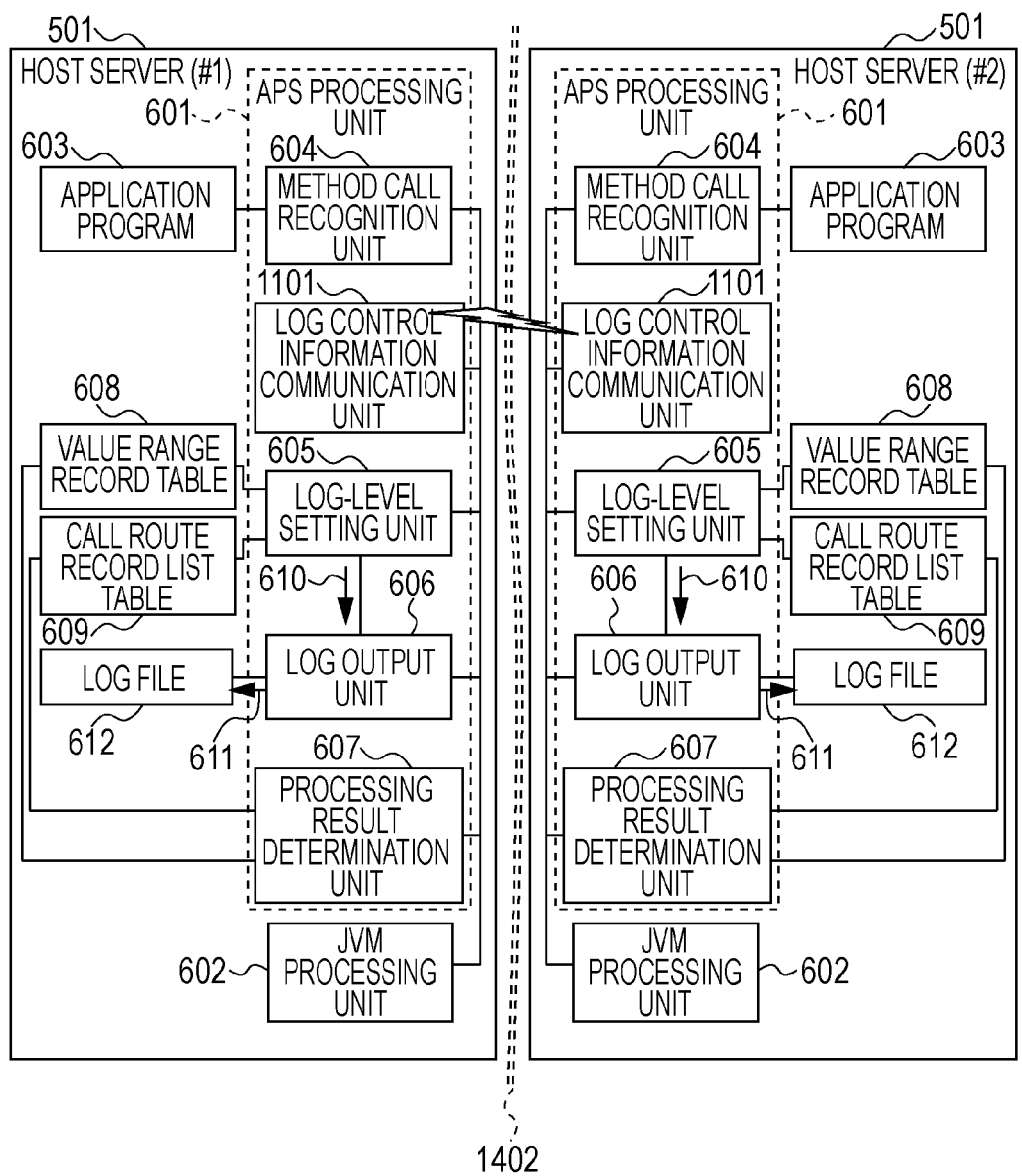
FIG. 11 is a block diagram depicting an exemplary configuration of the processing functionality of a host server according to the third embodiment.

FIG. 11 is a block diagram depicting an exemplary configuration of the processing functionality of the host server 501 of FIG. 5 according to the third embodiment.

In FIG. 11, the same reference numerals have been appended to the same constituent elements as in the processing functionality configuration of FIG. 6 according to the second embodiment, and a description thereof has been omitted.

The configuration of FIG. 11 differs with the configuration of FIG. 6 in that the host server 501 of FIG. 5 is present in plurality on the network 504, each of the host servers 501 is provided with a processing functionality configuration based on that of FIG. 6, and each APS processing unit 601 is provided with a log control information communication unit 1101.

This log control information communication unit 1101 corresponds to the log control information communication unit 107 of FIG. 1.

For example, the following control is executed if a method being executed by the JVM processing unit 602 in the #1 host server 501 calls a method of the application program 603 in the #2 host server 501. The log control information communication unit 1101 of the APS processing unit 601 in the #1 host server 501 transmits, via a communication channel 1402, log control information incorporated within the call to the call-destination method by the call-origin method. The log control information communication unit 1101 of the APS processing unit 601 in the #2 host server 501 receives the log control information transmitted by the log control information communication unit 1101 of the APS processing unit 601 in the #1 host server 501, and transfers the log control information to the log-level setting unit 605 in the #2 host server 501. The log output condition setting unit 103 in the #2 host server 501 uses that log control information to decide the log level 610 in the called method, and performs setting in the log output unit 606.

Figure 12:
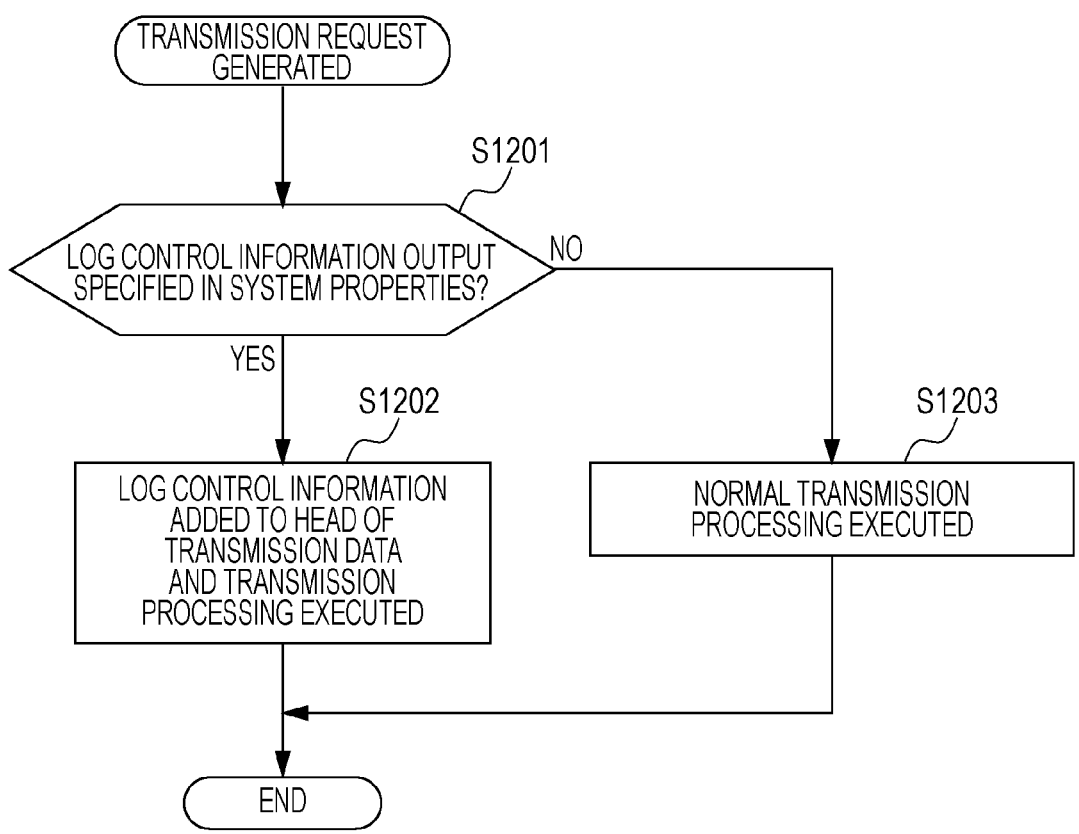
FIG. 12 is a flowchart depicting exemplary transmission processing of a log control information communication unit.

FIG. 12 is a flowchart depicting exemplary transmission processing that is executed if the log control information communication unit 1101 of FIG. 11 is the call origin.

This exemplary processing is processing in which, for example, the CPU 1501 of FIG. 15 that forms part of the host server 501 of FIG. 5 and is described hereafter reads a log control information transmission program from the external storage device 1505 to the memory 1502 and executes the log control information transmission program.

The processing of the flowchart of FIG. 12 is activated if a data write event by socket communication is generated as a transmission request by a method executed by the call-origin JVM processing unit 602.

First, the system properties of the method being executed are acquired by a query being issued to the JVM processing unit 602, and it is determined whether or not log control information output is specified therein (step S1201).

If log control information output is specified and the determination made in step S1201 is "yes", log control information is added to the head of the transmission data the transmission of which has been requested, and transmission processing is executed (step S1202).

If log control information output is not specified and the determination made in step S1201 is "no", normal transmission processing is executed with respect to the transmission data the transmission of which has been requested (step S1203).

After the transmission processing of step S1202 or S1203, the processing of the flowchart of FIG. 12 finishes, and the transmission processing of the log control information communication unit 1101 of FIG. 11 finishes.

Figure 13:
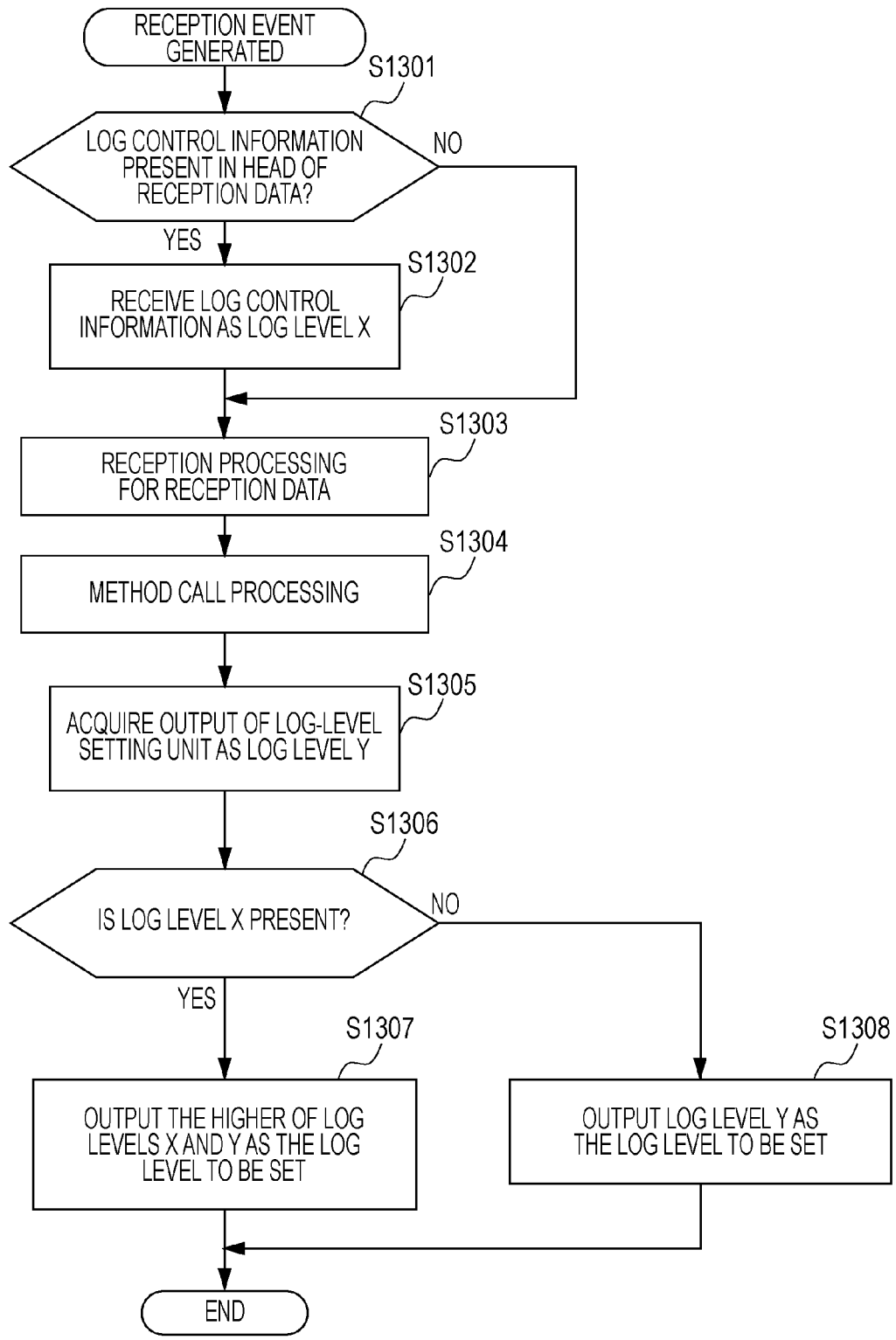
FIG. 13 is a flowchart depicting first exemplary reception processing of the log control information communication unit.

FIG. 13 is a flowchart depicting first exemplary reception processing that is executed if the log control information communication unit 1101 of FIG. 11 is the call destination.

This exemplary processing is processing in which, for example, the CPU 1501 of FIG. 15 that forms part of the host server 501 of FIG. 5 and is described hereafter reads a first log control information reception program from the external storage device 1505 to the memory 1502 and executes the first log control information reception program.

As previously mentioned in the description of the log control information communication unit 107 according to the first embodiment, either of the log level set in the method constituting the call origin and the call route of the method constituting the call origin may be employed as log control information.

FIG. 13 depicts reception processing of log control information at the call destination in the case where the log level set in the method constituting the call origin is employed as log control information.

This exemplary processing is activated if a reception event is generated. First, it is determined whether or not log control information has been added to the head of the reception data designated by the reception event (step S1301).

If log control information has been added and the determination made in step S1301 is "yes", that log control information is received as a log level X (step S1302). This log level X is retained in the memory 1502 of FIG. 15 that forms part of the host server 501 and is described hereafter, for example.

After the processing of step S1302, or after the determination made in step S1301 has become "no", reception processing for the reception data is executed (step S1303).

Thereafter, method call processing is executed based on that reception data (step S1304). This call is recognized by the calling side, for example, the method call recognition unit 604 of the APS processing unit 601 in the #2 host server 501.

As previously mentioned in the description of the second embodiment, the log-level setting unit 605 of the APS processing unit 601 in the #2 host server 501 is then activated, and the log level is decided. The log level output by this log-level setting unit 605 is acquired as a log level Y (step S1305). This log level Y is retained in the memory 1502 of FIG. 15 that forms part of the host server 501 and is described hereafter, for example.

Next, it is determined whether or not step S1302 has been executed and the log level X has been retained (step S1306).

If the log level X is retained, from among the log level X transmitted from the call origin retained in step S1302, and the log level Y output by the log-level setting unit 605 in the #2 host server 501 retained in step S1305, the higher log level is set in the log output unit 606 as the log level 610 to be set (step S1307).

However, if the log level X is not retained, the log level Y output by the log-level setting unit 605 in the #2 host server 501 retained in step S1305 is set in the log output unit 606 as the log level 610 to be set (step S1308).

After the processing of step S1307 or S1308, the processing of the flowchart of FIG. 13 finishes, and the reception processing of the log control information communication unit 1101 of FIG. 11 finishes.

Figure 14:
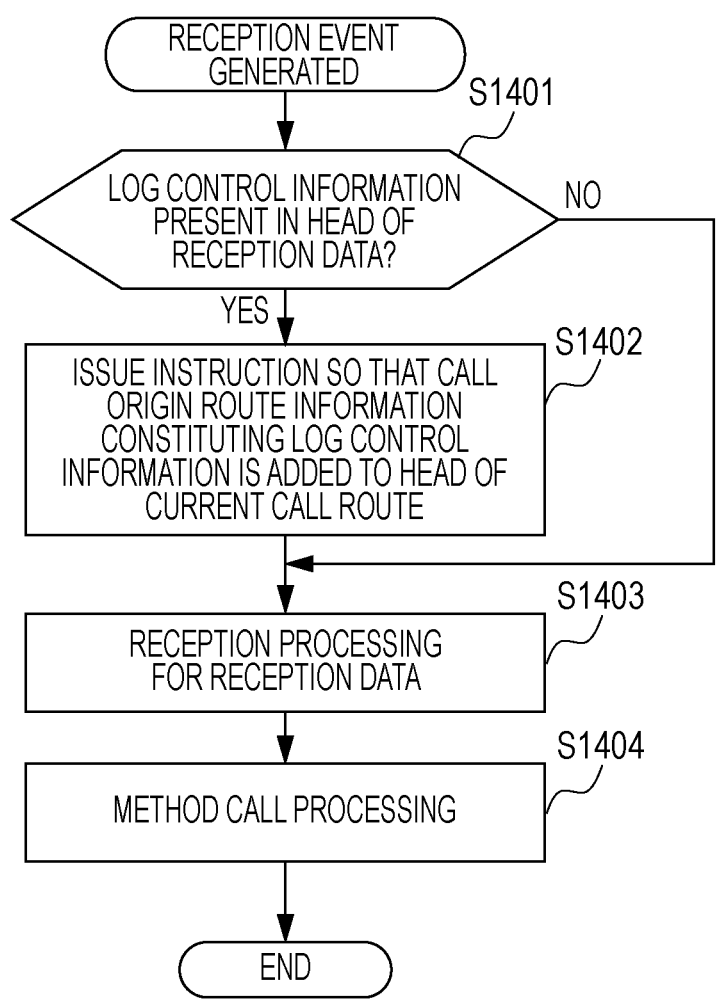
FIG. 14 is a flowchart depicting second exemplary reception processing of the log control information communication unit.

FIG. 14 is a flowchart depicting second exemplary reception processing that is executed if the log control information communication unit 1101 of FIG. 11 is the call destination.

This exemplary processing is processing in which, for example, the CPU 1501 of FIG. 15 that forms part of the host server 501 of FIG. 5 and is described hereafter reads a second log control information reception program from the external storage device 1505 to the memory 1502 and executes the second log control information reception program.

FIG. 14 depicts reception processing of log control information at the call destination in the case where the call route of the method constituting the call origin is employed as log control information.

As in the first exemplary reception processing of FIG. 13, this exemplary processing is activated if a reception event is generated.

First, it is determined whether or not log control information has been added to the head of the reception data designated by the reception event (step S1401).

If log control information has been added and the determination made in step S1401 is "yes", the following control processing is executed (step S1402). When the generation processing for the current call route is executed in the aforementioned step S904 of the log-level setting processing of FIG. 9 that is executed when a method call occurs, an instruction is issued so that call origin route information constituting log control information is added to the head of the current call route that is generated. To be specific, for example, together with the call origin route information, predetermined instruction information is set in the memory (the memory 1502 of FIG. 15 described hereafter, for example), and reference is made to the content thereof when step S904 of FIG. 9 is executed.

Thereafter, reception processing for reception data is executed (step S1403), and, in addition, method call processing is executed based on that reception data (step S1404). This call is recognized by the calling side, for example, the method call recognition unit 604 of the APS processing unit 601 in the #2 host server 501.

After the processing of step S1404, the processing of the flowchart of FIG. 14 finishes, and the reception processing of the log control information communication unit 1101 of FIG. 11 finishes.

Due to the aforementioned reception processing, when the generation processing for the current call route is executed in step S904 of the log-level setting processing of FIG. 9, the call origin route is added to the head of the current call route that is generated. Then, in step S905 of FIG. 9, the call route including also the call origin route is determined. As a result of this, it is possible to transmit the occurrence (or indication) of an abnormality across programs (processes, machines, methods), and it becomes possible to capture the occurrence (or indication) of abnormalities across the entire information processing system and improve the accuracy of detailed log output.

Here, if the call-origin method and the call-destination method are in the same host server 501, the log control information communication unit 1101 of the APS processing unit 601 in that host server 501 executes the transmission processing of FIG. 12 and the reception processing of FIG. 13 or FIG. 14. In the case of socket communication, because the communication is encapsulated in a socket, the log control information communication unit 1101 does not particularly have to be aware of whether or not the call-origin host server 501 is the same host server to which that log control information communication unit 1101 belongs.

FIG. 15 is a drawing depicting an exemplary hardware configuration of the information processing apparatus 100 according to the first embodiment.

The information processing apparatus 100 depicted in FIG. 15 has a central processing unit (CPU) 1501, a memory 1502, an input device 1503, an output device 1504, an external storage device 1505, a portable recording medium driving device 1506 into which a portable recording medium 1509 is inserted, and a communication interface 1507, and has a configuration in which these are connected to each other by a bus 1508. The configuration depicted in FIG. 15 is an example of a computer with which it is possible to implement the information processing apparatus 100, and such a computer is not restricted to this configuration.

The CPU 1501 is a processor that carries out all control for the information processing apparatus 100. The memory 1502 is a memory such as a RAM that, when a program is executed and data is updated and so forth, temporarily stores the program or the data stored in the external storage device 1505 (or the portable recording medium 1509). The CPU 1501 carries out all control by reading programs from the external storage device 1505 to the memory 1502 and executing the programs.

The input device 1503 detects an input operation by a keyboard or a mouse or the like performed by a user, and notifies that detection result to the CPU 1501.

The output device 1504 outputs, to a display device and a printer, data sent in accordance with the control performed by the CPU 1501.

The external storage device 1505 is a hard disk storage device, for example, and is mainly used for saving various data and programs.

The portable recording medium driving device 1506 accommodates the portable recording medium 1509, which is an optical disc, an SD memory card, or a compact flash memory card or the like. The optical disk may be a digital versatile disc (DVD) or a compact disc read-only memory (CD-ROM) or the like. The portable recording medium driving device 1506 in which the portable recording medium 1509 is accommodated has the role of assisting the external storage device 1505.

The communication interface 1507 is a device for connecting a communication line for a local area network (LAN) or a wide area network (WAN), for example.

The information processing apparatus 100 according to the present embodiment is implemented by the CPU 1501 executing a program having the functionality described hereafter. That program may be recorded and distributed on the external storage device 1505 or the portable recording medium 1509, for example, or may be acquired from a network by using the communication interface 1507.

In the embodiments described above, particularly in the second and third embodiments, examples have been described in which the application program 603 is a Java program that is executed by the JVM processing unit 602; however, as indicated in the first embodiment that has the processing functionality configuration of FIG. 1, the log acquisition target does not have to be restricted to a method, process, or thread of a Java program, and may be applied to a common program or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing a program that, when executed, causes a computer to perform a method, the method comprising:
   when a call for a log acquisition target is made, acquiring a context of the call, the context of the call including at least one of an input value that is passed as an argument to the log acquisition target when the log acquisition target is called and a call route of the log acquisition target when the log acquisition target is called; and
   based on the acquired context and storage information that has stored therein information in which a context of a call for the log acquisition target and a processing result of the call are associated, setting an output condition for a log in the log acquisition target, wherein
   when the acquired context of the call includes the input value which is within a range having a past processing record, or includes the call route which is a route having a past call record, the output condition is a low log level for the log, and
   when the acquired context of the call includes the input value which is not within the range having a past processing record, or includes the call route which is not a route having a past call record, the output condition is a high log level for the log.

2. The non-transitory computer-readable recording medium according to claim 1, the method further comprising:
   storing, in the storage information, the information in which the context of the call and the processing result of the call are associated.

3. The non-transitory computer-readable recording medium according to claim 1,
   the method further comprising:
   based on the acquired input value and input value storage information that has stored therein information in which an input value of a call for the log acquisition target and a processing result are associated, or based on the acquired call route and call route storage information that has stored therein information in which a call for the log acquisition target and a processing result are associated, setting the output condition for the log.

4. The non-transitory computer-readable recording medium according to claim 1, the method further comprising:
   when the log acquisition target is called from another program executed on the computer or another computer, transmitting log control information incorporated within the call to the log acquisition target from the other program, and using the log control information to set the output condition for the log in the log acquisition target.

5. The non-transitory computer-readable recording medium according to claim 4,
   wherein the log control information includes an output condition for a log that is set in the other program, and the method further comprising:
   comparing the output condition for the log set corresponding to the log acquisition target, and the output condition for the log of the other program transmitted from the other program, and setting a final output condition for a log in the log acquisition target.

6. The non-transitory computer-readable recording medium according to claim 4,
   wherein the log control information includes a call route of the program, and
   the method further comprising:
   when the log acquisition target is called, adding the call route of the other program to a head of the call route of the log acquisition target, and using the resulting call route as a new call route of the log acquisition target; and
   referring to call route storage information that has associated therein a call route of the log acquisition target and a processing result, to assess the new call route and thereby set the output condition for the log.

7. A log output condition setting apparatus, comprising:
   a memory and a processor coupled to the memory and configured to execute a process, the process comprising:
   acquiring, when a call for a log acquisition target is made, a context of the call, the context of the call including at least one of an input value that is passed as an argument to the log acquisition target when the log acquisition target is called and a call route of the log acquisition target when the log acquisition target is called; and
   setting, based on the acquired context and storage information that has stored therein information in which a context of a call for the log acquisition target and a processing result of the call are associated, an output condition for a log in the log acquisition target, wherein
   when the acquired context of the call includes the input value which is within a range having a past processing record, or includes the call route which is a route having a past call record, the output condition is a low log level for the log, and
   when the acquired context of the call includes the input value which is not within the range having a past processing record, or includes the call route which is not a route having a past call record, the output condition is a high log level for the log.

8. A log output condition setting method comprising:
   when a call for a log acquisition target is made, acquiring a context of the call, the context of the call including at least one of an input value that is passed as an argument to the log acquisition target when the log acquisition target is called and a call route of the log acquisition target when the log acquisition target is called; and
   based on the acquired context and storage information that has stored therein information in which a context of a call for the log acquisition target and a processing result of the call are associated, setting an output condition for a log in the log acquisition target, wherein
   when the acquired context of the call includes the input value which is within a range having a past processing record, or includes the call route which is a route having a past call record, the output condition is a low log level for the log, and
   when the acquired context of the call includes the input value which is not within the range having a past processing record, or includes the call route which is not a route having a past call record, the output condition is a high log level for the log.

* * * * *